United States Patent
Isono

(10) Patent No.: US 10,473,189 B2
(45) Date of Patent: Nov. 12, 2019

(54) GEARED TRANSMISSION UNIT

(71) Applicant: TOYOTA JIDOSHA KABUSHIKI KAISHA, Toyota-shi, Aichi (JP)

(72) Inventor: Hiroshi Isono, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 13 days.

(21) Appl. No.: 15/964,806

(22) Filed: Apr. 27, 2018

(65) Prior Publication Data

US 2018/0335108 A1 Nov. 22, 2018

(30) Foreign Application Priority Data

May 19, 2017 (JP) .................. 2017-099712

(51) Int. Cl.
*F16H 1/46* (2006.01)
*F16H 37/04* (2006.01)

(52) U.S. Cl.
CPC ............. *F16H 1/46* (2013.01); *F16H 37/041* (2013.01)

(58) Field of Classification Search
CPC .... F16H 1/46; F16H 37/041; F16H 2048/104; F16H 2048/106; F16H 57/082
See application file for complete search history.

(56) References Cited

U.S. PATENT DOCUMENTS

| | | | |
|---|---|---|---|
| 3,705,522 A * | 12/1972 | Ogawa | F16H 1/28 475/341 |
| 5,679,089 A * | 10/1997 | Levedahl | F16H 48/10 475/332 |
| 2009/0048054 A1* | 2/2009 | Tsuchiya | F16H 37/086 475/216 |
| 2016/0047443 A1* | 2/2016 | Watanabe | F16H 3/663 475/278 |

FOREIGN PATENT DOCUMENTS

JP 2010-060095 A 3/2010

* cited by examiner

*Primary Examiner* — Huan Le
(74) *Attorney, Agent, or Firm* — Oliff PLC

(57) ABSTRACT

A geared transmission unit in which a range of a speed ratio is widened without increasing a size of the transmission unit. The geared transmission unit comprises: a carrier coupled to the first shaft; a first pinion gear that is supported by the carrier; a first ring gear formed on a stationary member to be meshed with the first pinion gear; a first sun gear meshing with the first pinion gear; a second sun gear rotated integrally with the first sun gear; a second pinion gear supported by the carrier while being meshed with the second sun gear; a third pinion gear rotated integrally with the second pinion gear; and a second ring gear coupled to the second shaft while being meshed with the third pinion gear.

4 Claims, 2 Drawing Sheets

GEARED TRANSMISSION UNIT

CROSS REFERENCE TO RELATED APPLICATION

The present disclosure claims the benefit of Japanese Patent Application No. 2017-099712 filed on May 19, 2017, with the Japanese Patent Office.

BACKGROUND

Field of the Disclosure

Embodiments of the present disclosure relate to the art of a geared transmission unit for transmitting power through a planetary gear set.

Discussion of the Related Art

An example of this kind of transmission is described in JP-A-2010-60095. The planetary gear unit taught by JP-A-2010-60095 comprises two stepped pinion gears and a carrier that supports the stepped pinion gears in a rotatable manner and that is connected to a motor. The stepped pinion gears are arranged at equal intervals on the carrier, and each of the stepped pinion gears includes a fixed planetary gear and an output planetary gear. The output planetary gear is diametrically smaller than the fixed planetary gear, and size and number of teeth are different in those gears. The planetary gear unit taught by JP-A-2010-60095 further comprises a fixed gear fixed to a stationary member coaxially with a rotational center axis of the carrier, and an output gear coupled to an output shaft. The fixed gear is diametrically larger than the fixed planetary gear, and meshed with the fixed planetary gear. The output gear is diametrically larger than the output planetary gear, and meshed with the output planetary gear. When the carrier is rotated by a torque of the motor, the fixed planetary gear meshing with the fixed gear revolves around the fixed gear. Consequently, an output shaft integrated with the output gear meshing with the output planetary gear is rotated at a speed governed by a gear ratio between the output planetary gear and the output gear as well as a rotational speed and a revolving speed of the output planetary gear. That is, a speed ratio of the planetary gear unit taught by JP-A-2010-60095 as a ratio of the speed of the motor to the speed of the output shaft is governed by the gear ratio between the fixed planetary gear and the fixed gear and the gear ratio between the output planetary gear and the output gear. In the planetary gear unit taught by JP-A-2010-60095, therefore, the torque of the motor is multiplied according to the above-explained speed ratio and outputted from the output shaft.

Thus, in the planetary gear unit taught by JP-A-2010-60095, the output planetary gear revolves around the output gear coupled to the output shaft to rotate the output gear, and the rotational speed of the output planetary gear is reduced by the fixed gear and the fixed planetary gear meshing with the fixed gear. Therefore, the planetary gear unit taught by JP-A-2010-60095 as a speed reducing device may increase a speed reducing ratio. In the planetary gear unit taught by JP-A-2010-60095, however, the input shaft coupled to the carrier and the output shaft coupled to the fixed gear are arranged coaxially. For this reason, there may be a restriction on arrangements of an input mechanism and an output mechanism to be fitted into a vehicle. In addition, since the gears governing the speed ratio are arranged in an inner circumferential side of the carrier, sizes and numbers of teeth of the gears may be restricted. For this reason, it may be difficult to further increase the speed ratio or the speed reducing ratio in the planetary gear unit taught by JP-A-2010-60095.

SUMMARY

Aspects of embodiments of the present disclosure have been conceived noting the foregoing technical problems, and it is therefore an object of embodiments of the present disclosure is to provide a geared transmission unit in which a range of a speed ratio is widened without increasing a size of the transmission unit.

The embodiment of the present disclosure relates to a geared transmission unit that transmits torque between a first shaft and a second shaft while amplifying or reducing the torque. In order to achieve the above-explained objective, according to the embodiment of the present disclosure, the geared transmission unit is provided with: a carrier that is coupled to the first shaft; a first pinion gear that is supported by the carrier in a rotatable manner; a first ring gear that is formed on a predetermined stationary member to be meshed with the first pinion gear; a first sun gear that meshes with the first pinion gear; a second sun gear that is rotated integrally with the first sun gear; a second pinion gear that is supported in a rotatable manner by the carrier while being meshed with the second sun gear; a third pinion gear that is rotated integrally with the second pinion gear; and a second ring gear that is coupled to the second shaft while being meshed with the third pinion gear.

In a non-limiting embodiment, the geared transmission unit may further comprise: an external gear that is formed on the carrier; and a drive gear that meshes with the external gear. The drive gear may be coupled to the first shaft.

In a non-limiting embodiment, the first shaft may include an input shaft to which the torque is applied, and the second shaft may include an output shaft that outputs the torque.

In the gear transmission unit according to the embodiment of the present disclosure, when a torque is applied to the first shaft, the carrier is rotated by the torque. Consequently, the first pinion gears revolve along the first ring gear, and the first sun gear is rotated integrally with the second sun gear by the rotations of the first pinion gears. As a result, the second pinion gears are rotated integrally with the third pinion gears, and the torque is outputted from the second shaft. That is, in the geared transmission unit according to the embodiment, a speed ratio between the first shaft and the second shaft is governed by a gear ratio between the first ring gear and the first sun gear, a gear ratio between the second sun gear and the second pinion gear, and a gear ratio between the third pinion gear and the second ring gear. According to the embodiment, therefore, a ratio between the input speed and the output speed can be increased even if a difference between teeth numbers of gears is small. In other words, a speed reducing ratio of the geared transmission unit can be increased without increasing a size of any of the gears. In addition, since the number of gears can be increased in the geared transmission unit in comparison with that in the conventional transmission, a range of a speed ratio is widened and hence the speed ratio can be set flexibly.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENT(S)

Figure 1:
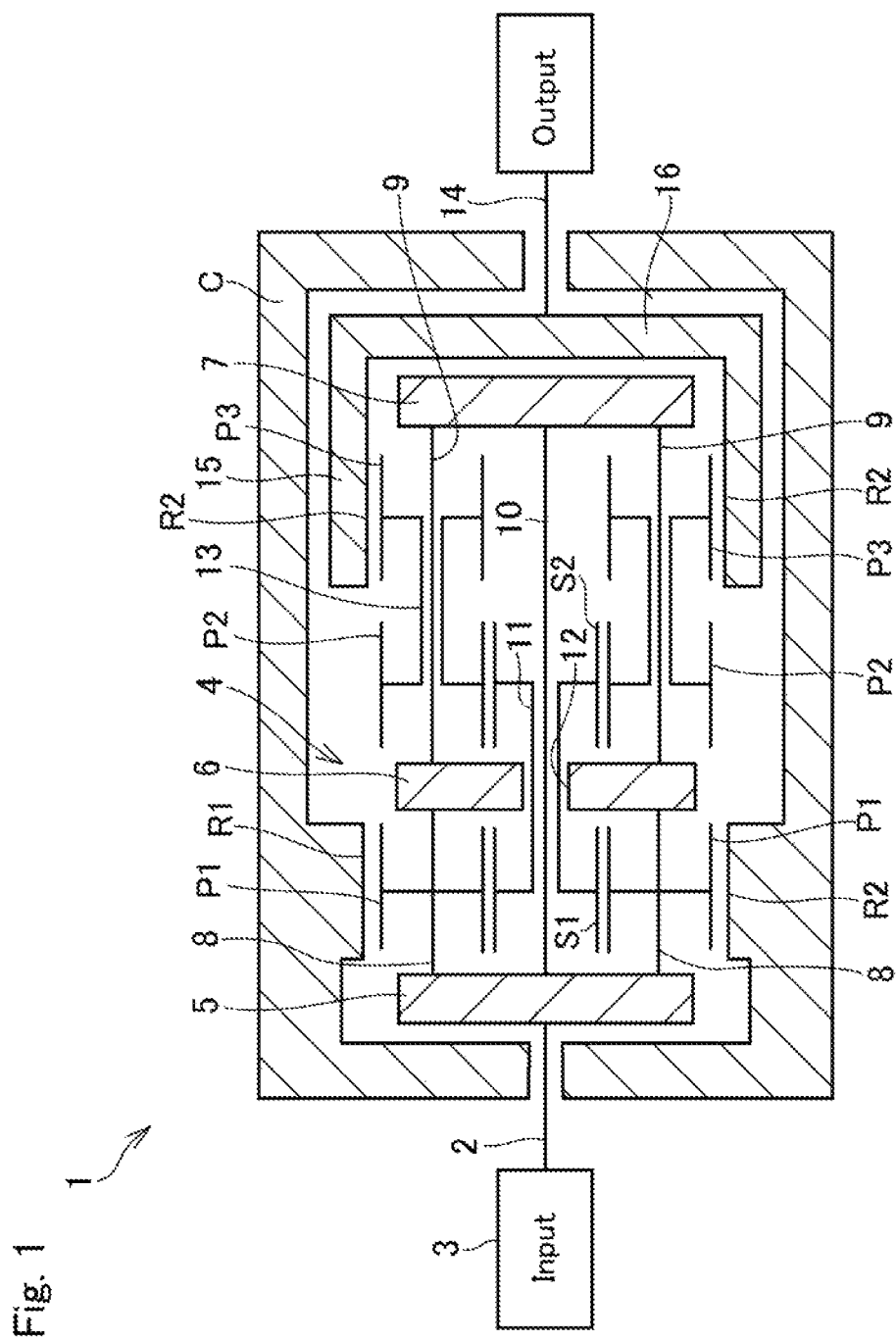
FIG. 1 is a cross-sectional view schematically showing one example of a structure of the geared transmission unit.

Preferred embodiments of the present disclosure will now be explained with reference to the accompanying drawings. Referring now to FIG. 1, there is shown one example of the geared transmission unit according to the present disclosure. A geared transmission unit 1 shown in FIG. 1 is adapted to serve as a speed reducing device. In the geared transmission unit 1, an input shaft 2 as a first shaft of the geared transmission unit 1 is connected to an actuator 3. The likes of a permanent magnet type synchronous motor or an induction motor, for example, may be adopted as the actuator 3, and the input shaft 2 is rotated by a torque of the actuator 3. Instead, a friction brake that generates a frictional braking force may also be adopted as the actuator 3. A carrier 4 supporting a plurality of pinion gears P1, P2, P3, and P4 is connected coaxially to the input shaft 2 so that torque of the input shaft 2 is applied to the carrier 4.

The carrier 4 comprises a first carrier plate 5, a second carrier plate 6, and a third carrier plate 7 arranged coaxially while being isolated away from one another in an axial direction. Specifically, the first carrier plate 5 is coupled to the input shaft 2, the third carrier plate 7 is disposed on the other side of the first carrier plate 5, and the second carrier plate 6 disposed between the first carrier plate 5 and the third carrier plate 7.

Outer circumferential portions of the first carrier plate 5 and the second carrier plate 6 are connected through a plurality of first pinion shafts 8, and outer circumferential portions of the second carrier plate 6 and the third carrier plate 7 are connected through a plurality of second pinion shafts 9. The first pinion shafts 8 and the second pinion shafts 9 are arranged in a circular manner at predetermined intervals. For example, each of the first pinion shafts 8 and the second pinion shafts 9 may be aligned to each other. Instead, the first pinion shafts 8 may be extended to connect the first carrier plate 5 and the third carrier plate 7 while penetrating through the second carrier plate 6. In this case, the second pinion shafts 9 are omitted.

Rotational centers of the first carrier plate 5 and the third carrier plate 7 are connected through a center shaft 10 penetrating through a center hole 12 of the second carrier plate 6. In the geared transmission unit 1, therefore, the first carrier plate 5, the second carrier plate 6, and the third carrier plate 7 are rotated integrally.

Specifically, the first pinion gears P1 are supported by the first pinion shafts 8 in a rotatable manner. The geared transmission unit 1 is held in a case C as a stationary member, and a first ring gear R1 is formed on an inner face of the case C to be meshed with the first pinion gears P1. The first pinion gears P1 also mesh with an annular first sun gear S1 formed around the center shaft 10.

The first sun gear S1 is coupled to a cylindrical sun gear shaft 11 penetrating through the center hole 12 of the second carrier plate 6 to be connected to a second sun gear S2. In other words, the first sun gear S1 is connected to the second sun gear S2 through the sun gear shaft 11 across the second carrier plate 6. Thus, the first sun gear S1 and the second sun gear S2 are rotated integrally.

The second pinion gears P2 as external gears are supported by the second pinion shafts 9 in a rotatable manner around the second sun gear S2 while being meshed with the second sun gear S2. Each of the second pinion gears P2 is individually connected to the third pinion gear P3 through a cylindrical connecting shaft 13 to be rotated integrally with the third pinion gear P3.

A second ring gear R2 comprises a cylindrical portion 15 extending in the axial direction around the third carrier plate 7, and a disc portion 16 closing one end of the cylindrical portion 15 while being opposed to the third carrier plate 7. Internal teeth are formed on an inner circumferential face of the cylindrical portion 15, and the third pinion gears P3 are meshed with the internal teeth of the cylindrical portion 15. An output shaft 14 as a second shaft is attached to a rotational center of the disc portion 16 so that torque of the second ring gear R2 is delivered to the output shaft 14.

Here will be explained an action of the geared transmission unit 1. When the carrier 4 is rotated by the torque of the actuator 3, the pinion gears P1, P2, and P3 revolves around the sun gears S1 and S2. Specifically, since the first ring gear R1 is fixed to the case C, the pinion gears P1 revolves around the sun gears S1 while rotating in an opposite direction to the carrier 4. A rotational speed of each of the first pinion gears P1 can be expressed as:

$$Nin(1-ZR1/ZP1)$$

where $N_{in}$ is a speed of the carrier 4, ZR1 is the teeth number of the first ring gear R1, and ZP1 is the teeth number of the first pinion gear P1.

Consequently, the first sun gear S1 is rotated by the rotations of the first pinion gears P1, and a rotational speed Ns1 of the first sun gear S1 can be expressed as:

$$Ns1 = Nin(1+ZR1/ZS1)$$

where ZS1 is the teeth number of the first sun gear S1. Thus, the first sun gear S1 is rotated at a speed higher than the rotational speed of the carrier 4 in the same direction as the carrier 4. In this situation, since the second sun gear S2 is connected to the first sun gear S1 through the sun gear shaft 11, the second sun gear S2 is rotated integrally with the first sun gear S1 at the same speed as the first sun gear S1 in the same direction as the carrier 4.

The second pinion gears P2 are rotated by a torque of the second sun gear S2 and the rotation of the carrier 4. A rotational speed Np2 of each of the second pinion gears P2 can be expressed as:

$$Np2 = Nin(1-(ZR1/ZS1) \cdot (ZS2/ZP2)).$$

where ZS2 is the teeth number of the second sun gear S2, and ZP2 is the teeth number of the second pinion gear P2. Thus, the rotational speed and the rotational direction of the second pinion gears P2 are governed by a gear ratio between the first ring gear R1 and the first sun gear S1, and a gear ratio between the second sun gear S2 and the second pinion gear P2. In this situation, since the third pinion gear P3 is connected to the second pinion gear P2 through the connecting shaft 13, the third pinion gear P3 is rotated integrally with the second pinion gear P2 at the same speed and in the same direction as the second pinion gear P2.

The second ring gear R2 is rotated by the rotations of the third pinion gears P3. A rotational speed Nr2 of the second ring gear R2 can be expressed as:

$$Nr2 = Nin(1-(ZR1/ZS1) \cdot (ZS2/ZP2) \cdot (ZP3/ZRS2))$$

where ZR2 is the teeth number of the second ring gear R2, and ZP3 is the teeth number of the third pinion gear P3. Thus, the rotational speed and the rotational direction of the second ring gear R2 are governed by the gear ratio between the first ring gear R1 and the first sun gear S1, the gear ratio between the second sun gear S2 and the second pinion gear P2, and a gear ratio between the third pinion gear P3 and the second ring gear R2.

For example, given that Nin is 1, ZR1 is 30, ZS1 is 29, ZS2 is 30, ZP2 is 31, ZP3 is 30, and ZR2 is 30, an output speed Nout of the output shaft 14 (i.e., the rotational speed of the second ring gear R2) is:

$$Nout=-0.001112.$$

In this case, when the input shaft 2 and the carrier 4 are rotated by the actuator 3, the output shaft 14 is rotated 0.001112 times in an opposite direction to the input shaft 2. That is, the input torque is multiplied to be outputted. Accordingly, a speed reducing ratio $\gamma$ as an inverse of Nout is −899.

Thus, in the geared transmission unit 1 according to the embodiment, the speed reducing ratio $\gamma$ between the input shaft 2 and the output shaft 14 is governed by the gear ratios of three pairs of gears. According to the embodiment, therefore, the ratio of the input speed Nin to the output speed Nout can be increased without increasing a size of any of the gears. In other words, the geared transmission unit 1 can be downsized while increasing a speed reducing ratio. For this reason, the gears P1, P2, P3, S1, and S2 are allowed to be downsized. In addition, in the geared transmission unit 1, the speed ratio is set by the three pairs of gears, that is, total six gears. On the other hand, in the planetary gear unit taught by JP-A-2010-60095, a speed ratio is set by four gears. In the geared transmission unit 1 according to the embodiment, therefore, a range of a speed ratio is widened and hence the speed ratio can be set flexibly.

Figure 2:
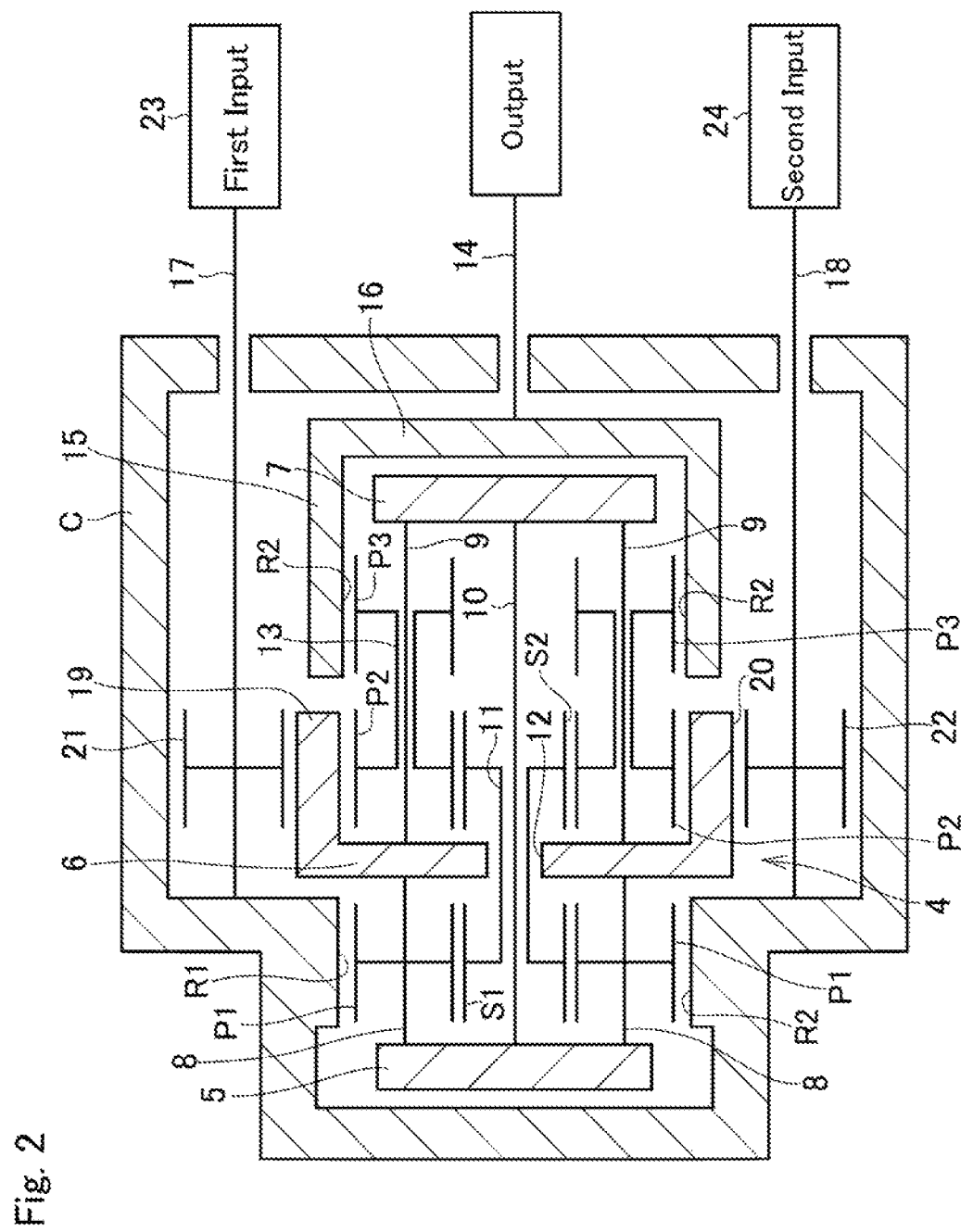
FIG. 2 is a cross-sectional view schematically showing another example of a structure of the geared transmission unit.

Turning to FIG. 2, there is shown another example of the geared transmission unit 1. In the geared transmission unit 1 shown in FIG. 2, two input shafts 17 and 18 are arranged on the same side as the output shaft 14. A cylindrical portion 19 extends from an outer circumference of the second carrier plate 6 toward the third carrier plate 7, and an external gear 20 is formed on an outer circumferential face of the cylindrical portion 19. At least two drive gears 21 and 22 are meshed with the external gear 20, and each of the drive gears 21, 22 is diametrically smaller than the external gear 20. Specifically, the drive gear 21 is connected to an actuator 23 through the input shaft 17, and the drive gear 22 is connected to an actuator 24 through the input shaft 18. In the geared transmission unit 1 shown in FIG. 2, therefore, output torques of the actuators 23 and 24 are transmitted to the carrier 4 in accordance with a gear ratio between the external gear 20 and the drive gear 21, 22. For this reason, a torque to be generated by one of the actuators 23 and 24 can be reduced. In other words, each of the actuators 23 and 24 can be downsized respectively. According to another example, therefore, the geared transmission unit 1 can be further downsized and a speed ratio can be further increased.

Although the above exemplary embodiments of the present disclosure have been described, it will be understood by those skilled in the art that the present disclosure should not be limited to the described exemplary embodiments, and various changes and modifications can be made within the scope of the present disclosure. For example, the geared transmission unit 1 may be modified to serve as a speed increasing device. In this case, the output shaft 14 is coupled to the carrier 4, and the input shaft 2 is coupled to the second ring gear R2. In the geared transmission unit 1 thus modified, a rotational speed of the output shaft 14 is increased higher than a rotational speed of the input shaft 2. Further, in the geared transmission unit 1 shown in FIG. 2, a brake device, a generator, or a motor-generator may be used as one of the actuator 3 to generate a braking force.

What is claimed is:

1. A geared transmission unit that transmits torque between a first shaft and a second shaft while amplifying or reducing the torque, comprising:
   a carrier that is coupled to the first shaft;
   a first pinion gear that is supported by the carrier in a rotatable manner;
   a first ring gear that is formed on a predetermined stationary member to be meshed with the first pinion gear;
   a first sun gear that meshes with the first pinion gear;
   a second sun gear that is rotated integrally with the first sun gear;
   a second pinion gear that is supported in a rotatable manner by the carrier while being meshed with the second sun gear;
   a third pinion gear that is rotated integrally with the second pinion gear; and
   a second ring gear that is coupled to the second shaft while being meshed with the third pinion gear.

2. The geared transmission unit as claimed in claim 1, further comprising:
   an external gear that is formed on the carrier; and
   a drive gear that meshes with the external gear,
   wherein the drive gear is coupled to the first shaft.

3. The geared transmission unit as claimed in claim 2,
   wherein the first shaft includes an input shaft to which the torque is applied, and
   wherein the second shaft includes an output shaft that outputs the torque.

4. The geared transmission unit as claimed in claim 1,
   wherein the first shaft includes an input shaft to which the torque is applied, and
   wherein the second shaft includes an output shaft that outputs the torque.

* * * * *